US007031755B2

(12) United States Patent
Li et al.

(10) Patent No.: US 7,031,755 B2
(45) Date of Patent: Apr. 18, 2006

(54) DISTRIBUTED SMART ANTENNA SYSTEM

(75) Inventors: Shihe Li, Beijing (CN); Jun Li, Beijing (CN); Feng Li, Beijing (CN)

(73) Assignee: China Academy of Telecommuncations Technology, Beijing (CN)

( * ) Notice: Subject to any disclaimer, the term of this patent is extended or adjusted under 35 U.S.C. 154(b) by 257 days.

(21) Appl. No.: 10/226,584

(22) Filed: Aug. 23, 2002

(65) Prior Publication Data

US 2002/0193147 A1 Dec. 19, 2002

Related U.S. Application Data

(63) Continuation of application No. PCT/CN01/00016, filed on Jan. 12, 2001.

(30) Foreign Application Priority Data

Feb. 24, 2000 (CN) ............................ 00103041 A

(51) Int. Cl.
*H04M 1/00* (2006.01)

(52) U.S. Cl. .............................. 455/562.1; 455/575.7; 455/561

(58) Field of Classification Search ............ 455/553.1, 455/561, 562.1, 575.7, 90.3, 91, 92, 97, 107, 455/121, 279.1, 550.1
See application file for complete search history.

(56) References Cited

U.S. PATENT DOCUMENTS 5,574,466 A * 11/1996 Reed et al. ................ 342/359
5,627,879 A 5/1997 Russell et al.
5,648,961 A 7/1997 Ebihara
5,648,968 A * 7/1997 Reudink .................... 370/335
5,802,173 A * 9/1998 Hamilton-Piercy et al. ......................... 379/56.2
5,805,983 A 9/1998 Naidu et al.
5,809,395 A * 9/1998 Hamilton-Piercy et al. . 725/106
5,893,033 A * 4/1999 Keskitalo et al. ........... 455/437
6,078,788 A * 6/2000 Haardt ....................... 455/65
6,128,470 A 10/2000 Naidu et al.
6,266,545 B1 * 7/2001 Backman et al. ........... 455/572
6,415,163 B1 * 7/2002 Keskitalo et al. ........ 455/562.1
6,448,926 B1 * 9/2002 Weinberg et al. ...... 342/357.06
6,496,142 B1 * 12/2002 Iinuma ...................... 342/368
6,535,733 B1 * 3/2003 Matusevich et al. ........ 455/424

FOREIGN PATENT DOCUMENTS

GB 2339079 12/2000
JP 10126138 A * 5/1998
WO WO 00/42801 7/2000

OTHER PUBLICATIONS

International Search Report corresponding to International Application No. PCT/CN01/00016, dated May 17, 2001.

* cited by examiner

*Primary Examiner*—CongVan Tran
(74) *Attorney, Agent, or Firm*—Alston & Bird LLP

(57) ABSTRACT

A distributed smart antenna system including an antenna array having N antenna elements, N radio frequency tranceivers, and feeder cables connecting both. N antenna elements and N radio frequency transceivers are grouped according to cell coverage range and traffic volume. Antenna element groups are then distributed at different places of coverage within the range of the same wireless communication system base station, including different buildings or different floors of same building; however, the same baseband digital signal processor is used. Each antenna element group can have one to M antenna elements. The system enables improved cell coverage, increased system capacity, and decreased system cost.

10 Claims, 4 Drawing Sheets

DISTRIBUTED SMART ANTENNA SYSTEM

CROSS-REFERENCE TO RELATED APPLICATIONS

This is a continuation application of PCT/CN01/00016, filed Jan. 12, 2001, which is incorporated herein by reference in its entirety. The present application also claims the benefit of Chinese Patent Application No. 00103041.8, filed Feb. 24, 2000.

FIELD OF THE INVENTION

The present invention relates generally to mobile communications technology, and more particularly to a smart antenna system for a cellular mobile communications system.

BACKGROUND OF THE INVENTION

Smart antenna technology is an important technology in modem mobile communications technology, especially in cellular mobile communications systems. Advantages of smart antenna technology include: increased system capacity, increased coverage area of a wireless base station, decreased system cost and greater system performance. Therefore, smart antenna technology has become an important research subject of high technology fields around the world.

A smart antenna system generally comprises: an antenna array having N antenna elements, N radio frequency transceivers and N feeder cables connecting the N antenna elements and the N radio frequency transceivers, respectively. Among them, the N antenna elements and the N feeder cables compose an antenna feeder cable unit. The antenna array and the N radio frequency transceivers compose a radio frequency unit. In a wireless base station, analog signals, transmitted and received by radio frequency units, are transformed by high speed ADC/DAC, and then signals transformed are connected with a data bus, which is connected with a baseband digital signal processor (DSP). Smart antenna functions, such as uplink beam forming and downlink beam forming, are implemented in the baseband DSP.

FIG. 1 shows a wireless base station structure with smart antenna, illustrating the basic structure and working principle of a modern smart antenna. The base station works at CDMA TDD (Code Division Multiple Access, Time Division Duplex). The antenna feeder cable units comprise N antenna elements 11, 12, 13, . . . , 1N, which consist an antenna array, and corresponding feeder cables. Each antenna feeder cable unit is connected with a radio frequency transceiver TRX 21, 22, 23, . . . , 2N. N radio frequency transceivers commonly use one frequency and timing unit 30 (local oscillator), so the radio frequency transceivers 21, 22, 23, . . . , 2N work coherently. Signals received by each radio frequency transceiver are converted to digital sampling signals by an internal ADC of radio frequency transceiver, and then are sent to baseband digital signal processor 33 through high speed data bus 31. Digital signals to be transmitted on high data bus 31 are converted to analog signals by an internal DAC of radio frequency transceiver, and are transmitted by antenna elements 11, 12, 13, . . . , 1N.

All baseband digital signal processing is performed in the baseband digital signal processor 33. Such a processing method is detailed in Chinese Patent No. CN 97104039, the contents of which are incorporated herein by reference. In the baseband processor hardware platform with advanced digital signal processing, processing functions such as modulation and demodulation, receiving and transmitting (uplink and downlink) and beam forming, among others, can be implemented. With these processing functions multiple access interference and multiple path interference can be overcome, and receiving signal-to-noise ratio and sensitivity are raised and EIRP (Equivalent Isotropically Radiated Power) is increased. At present, all smart antennas use a ring antenna array or a linear antenna array, and the ring or linear antenna array is concentrated on one place in order to obtain an isotropical covering or a sector covering, such as disclosed in Chinese Patent No. CN 97104039. In accompanying with increase of dense and high of buildings in city, the working frequency of mobile communication system is relatively high (1 to 3 GHz) in a building or a cell. In this case, due to the shielding function of buildings and loses due to floors and walls, many shaded areas appear and the coverage range of a mobile communication system is limited. Typically, in order to solve the coverage problem, when designing cellular mobile communication system in an urban area of a city, the number of base stations must be increased. However, this solution will increase system investment and maintenance difficulties. Although in theory a smart antenna will improve the coverage range of a base station, if multiple antenna units of an antenna array are concentrated, the coverage problem cannot be fully solved.

SUMMARY OF THE INVENTION

The distributed smart antenna system of the present invention improves the coverage range of a cell, greatly increases system capacity and decreases system cost. Generally, the distributed concept of the present invention includes first, grouping antenna feeder cable units and radio frequency transceivers of an smart antenna system, then installing different groups of antenna feeder cable units and radio frequency transceivers at different places according to coverage requirement, while using one baseband digital signal processor for all groups.

According to one embodiment of the present invention, there is disclosed a distributed smart antenna system having N antenna elements, N radio frequency transceivers and feeder cables connecting the N antenna elements with the N radio frequency transceivers, respectively. The N radio frequency transceivers connect with a baseband digital signal processor in a wireless communication system base station through a data bus. The N antenna elements and the N radio frequency transceivers are correspondingly grouped to get multiple antenna element groups and corresponding multiple radio frequency transceiver groups. Different antenna element groups are distributed at different places of coverage range of the wireless communication system base station. Each antenna element group connects with corresponding radio frequency transceiver group. Each radio frequency transceiver group connects with the baseband digital signal processor through the data bus.

According to one aspect of the invention, the grouping is based on the coverage cell range of the wireless communication system base station and traffic volume of the coverage cell range or coverage floor number of the wireless communication system base station and traffic volume of the coverage floor. According to another aspect of the invention, each antenna element group has 1 to M antenna elements connected correspondingly with 1 to M radio frequency transceivers of corresponding radio frequency transceiver group, where the selection of M is based on number of mobile subscribers and propagation environment. Among them, 1 to M antenna elements of one antenna element group and 1 to M radio frequency transceivers of correspondingly radio frequency transceiver group are distributed at same place, or 1 to M antenna elements of one antenna element group are distributed at same place, and radio frequency transceivers of correspondingly and de-correspondingly radio frequency transceiver group are distributed in concentration.

According to yet another aspect of the invention, the different places comprise different buildings in cells covered by the wireless communication system base station or different floors in a building covered by the wireless communication system base station. For the different floors in a building, the distribution can be based on that each floor is allocated with an antenna element group or one to two floors are allocated with an antenna element group, and each antenna element group applies same frequency, time slot and code channel, in interleaving. For the different floors in a building, the distribution could also be based on that each floor is allocated with an antenna element group, and each antenna element group applies same frequency, time slot and code channel, but different interference codes and training sequences.

According to another embodiment of the present invention, there is disclosed a distributed smart antenna system including N antenna element groups, N radio frequency transceiver groups and a baseband digital signal processor. Each antenna element group comprises 1 to M antenna elements and each radio frequency transceiver group comprises 1 to M radio frequency transceivers. One to M antenna elements of one antenna element group connect correspondingly with 1 to M radio frequency transceivers of one radio frequency transceiver group to form N groups. Antenna elements of different groups are distributed on different buildings of coverage range of a wireless communication system base station, and apply same frequency, time slot and code channel. Radio frequency transceivers of different groups connect with a baseband digital signal processor through a data bus. According to one aspect of the invention, the 1 to M radio frequency transceivers and corresponding 1 to M antenna elements of one group are set on the same building or different buildings.

According to yet another embodiment of the present invention, there is disclosed a distributed smart antenna system including N antenna element groups, N radio frequency transceiver groups and a baseband digital signal processor. According to the invention, each antenna element group can include 1 to M antenna elements and each radio frequency transceiver group can include 1 to M radio frequency transceivers. One to M antenna elements of one antenna element group connect correspondingly with 1 to M radio frequency transceivers of one radio frequency transceiver group to form N groups. Antenna elements of different groups are distributed on different floors of a building of coverage range of a wireless communication system base station, and apply, in interleaving, the same frequency, time slot and code channel, or the same frequency, time slot and code channel, but using different interference codes and training sequences. Radio frequency transceivers of different groups connect with a baseband digital signal processor through a data bus.

According to one aspect of the invention, the 1 to M radio frequency transceivers and corresponding 1 to M antenna elements of one group are set on same floor or different floors of the building. According to necessities of cell coverage range and traffic volume, the distributed smart antenna system of the invention divides antenna elements consisting of a smart antenna array, corresponding radio frequency transceivers and feeder cables, into groups. Then, according to coverage requirements, each smart antenna element is distributed, in group, at different buildings of same cell or different floors of same building. However, all antenna elements of each smart antenna group is concentrated at one place. All smart antenna groups and radio frequency transceiver groups commonly use one baseband digital signal processor.

According to one aspect of the present invention, a wireless base station within the distributed smart antenna system will process multiple groups of antenna elements, and multiple groups of antenna elements are set at multiple places according to requirement. In this way, a better coverage effect can be obtained. According to set location of each antenna element group and mutual isolation condition, in a service range of same wireless base station, frequency can be multiplexed to raise spectrum utilization coefficient. Especially in a CDMA mobile communication system, except using same (or different) carrier frequency, same (or different) time slot and same (or different) code channel can be used as well, i.e. wireless communication resources such as frequency, time slot and code channel can be more effectively multiplexed. This means when improving cell coverage, communication system capacity can be increased and cost of communication system can be decreased at the same time. Of course, as antenna elements of each group are set at different places, feeder cable length is different, so antenna calibration technology must be used. A specific calibration method is referenced in the Chinese Patent application filed by the applicant of the present invention, titled "Method and Device for Calibrating an Smart Antenna Array", Patent Application No. 99111350.0.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
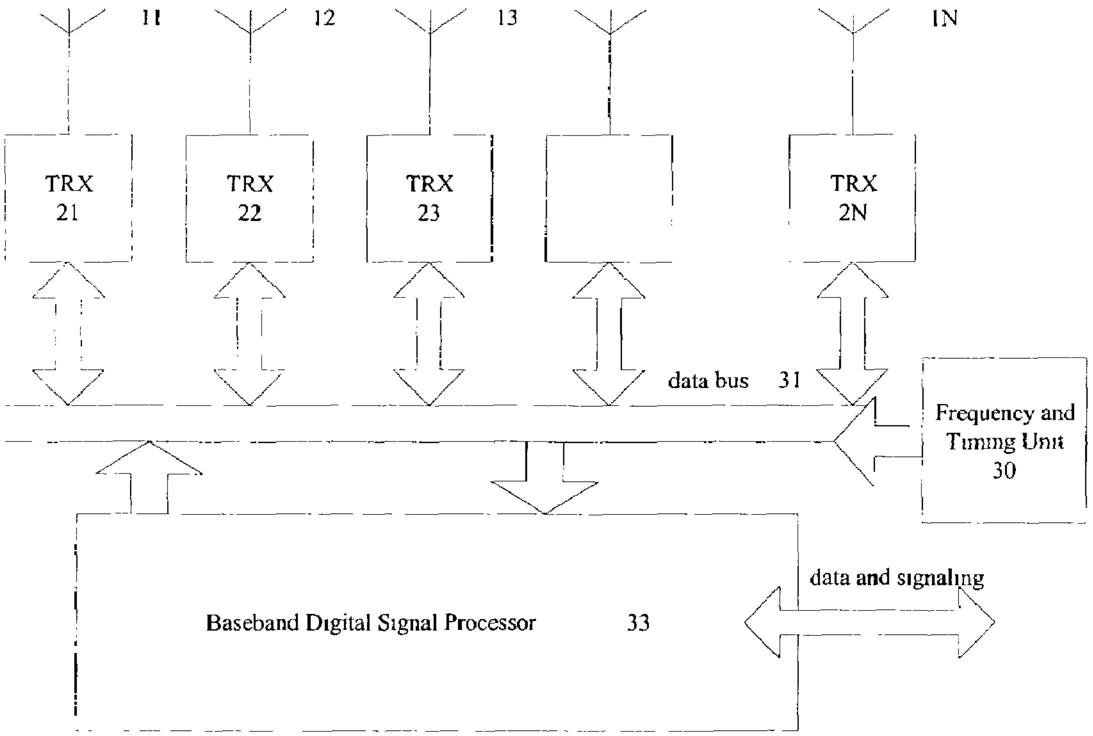
FIG. 1 (Prior Art)
FIG. 1 is a base station diagram of wireless communication system with a smart antenna.
Figure 2:
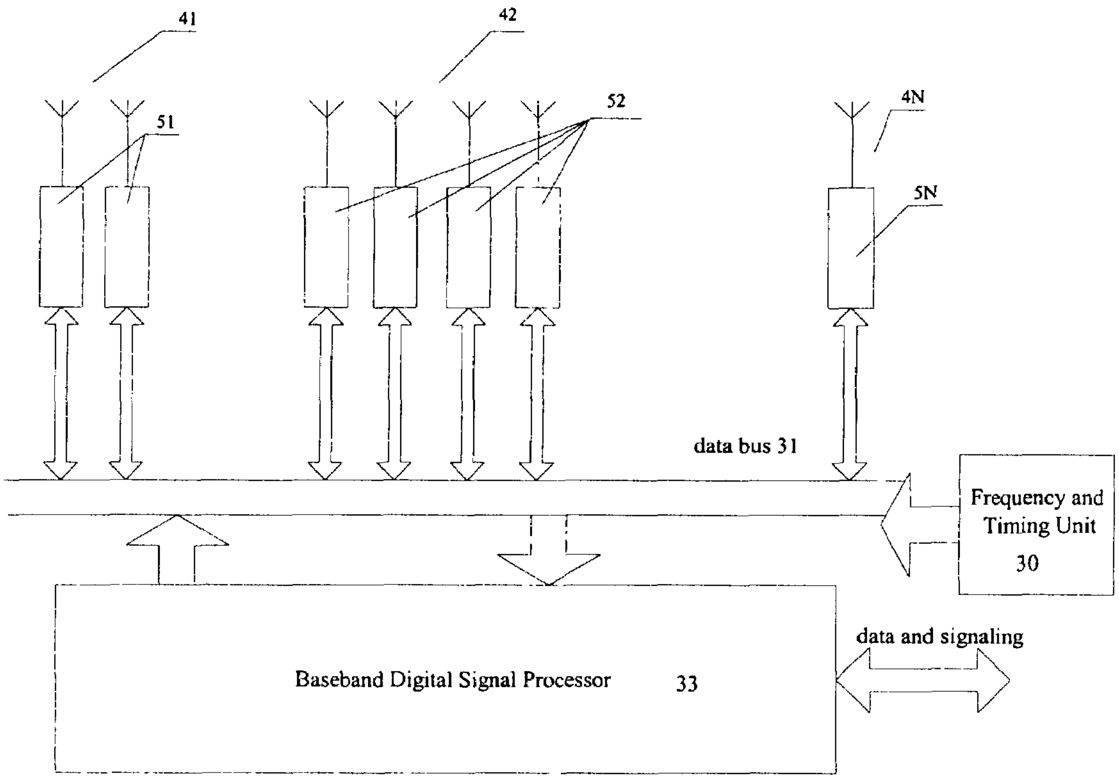
FIG. 2 is a base station diagram of wireless communication system with a distributed smart antenna.

FIG. 1 was described in detail previously herein and thus, its description will not be repeated again. Comparing FIG. 2 with FIG. 1, the difference is that in FIG. 1 the antenna elements 11 to 1N which comprise an antenna array form a ring array or a linear array concentrated at one place; in the present invention illustrated in FIG. 2, antenna feeder cable units and relating radio frequency transceivers are set distributed according groups. For instance, as shown in FIG. 2, antenna feeder cable unit groups 41, 42, . . . , 4N and corresponding radio frequency transceiver groups 51, 52, . . . , 5N. The number of antenna elements in each antenna feeder cable unit group and the number of radio frequency transceivers in each radio frequency transceiver group can be set according to requirements of the system, as described below; however, in a preferred embodiment of the present invention there is at least one antenna element and one radio frequency transceiver, 4N and 5N, respectively. As illustrated in FIG. 2, there are four antenna elements and four radio frequency transceivers in antenna feeder cable unit group 42 and radio frequency transceiver group 52. Each group of antenna feeder cable units and each group of radio frequency transceivers cover an area in which coverage is needed, but each group share the use of one wireless communication system base station. Obviously, the length of feeder cables connecting each antenna feeder cable unit group with a corresponding radio frequency transceiver group, are different. In a base station of wireless communication system with a distributed smart antenna, each antenna feeder cable unit group and corresponding radio frequency transceiver group can work at different or same carrier frequency, at different or same time slot and at different or same code channel. When each antenna feeder cable unit group and corresponding radio frequency transceiver group work at same frequency, same time slot and same code channel, the capacity of the wireless communication system can be greatly increased.

Figure 3:
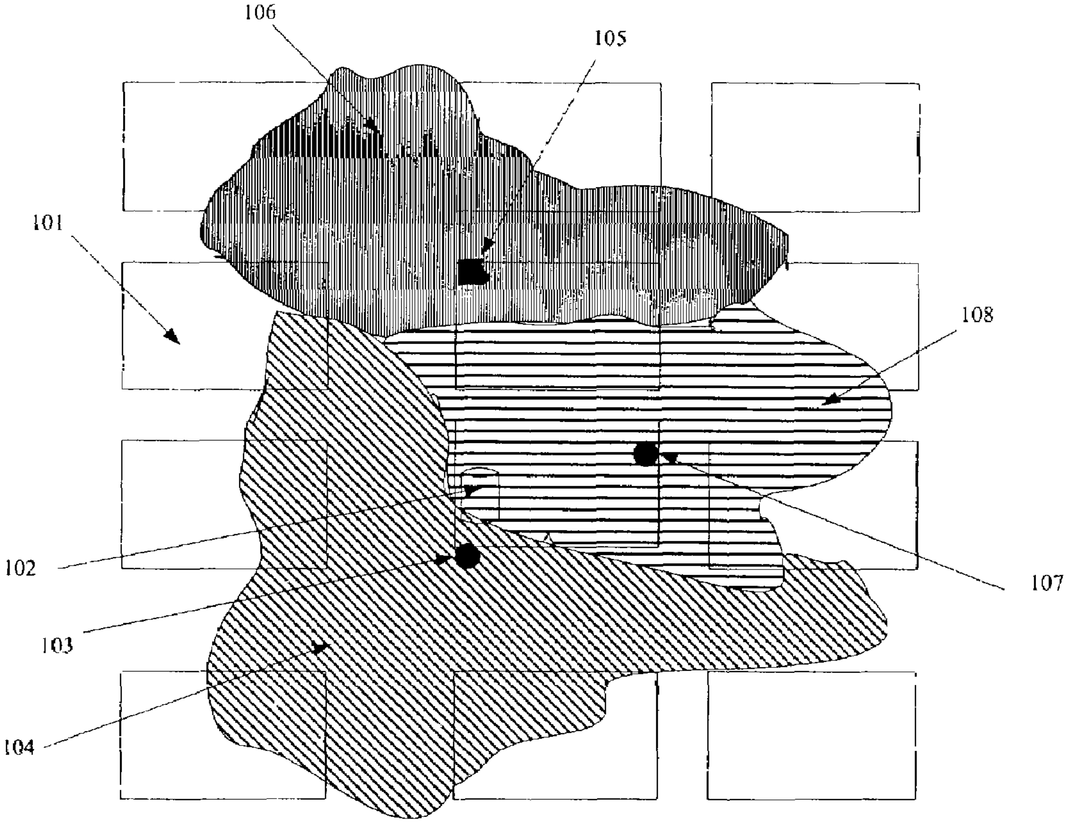
FIG. 3 is a distributed structure diagram of base station of wireless communication system with a distributed smart antenna used at urban area of a city.

The base station of wireless communication system with a distributed smart antenna, mentioned above, can be practically used in microcellular and micromicrocellular mobile communication systems. The microcellular and micromicrocellular mobile communication system is just a mobile communication system environment for densely populated cities and dense building areas in the future. FIG. 3 shows a distributed embodiment for a wireless communication system base station with a distributed smart antenna used at an urban city area. As the working frequency of mobile communication system is higher, for example 2 GHz, dense buildings, as shown in FIG. 3 as 12 rectangles 101, seriously obstruct transmission signals. In order to provide enough capacity, a communication system design may utilize a micro cell design. Generally, in such a system the antenna height does not exceed the average height of roofs in the micro cell. If a wireless communication system base station applies concentrated smart antenna structure as shown in FIG. 1, the coverage of antenna system will be very limited (reference to ITU-R M. 1225 proposal).

Utilizing one embodiment of the present invention, a wireless communication system base station 102 uses three antenna feeder cable unit groups 103, 105 and 107. Three antenna feeder cable unit groups are distributed at three locations. The result is that one wireless communication system base station equivalently implements the coverage area of three wireless communication system base stations 104, 106 and 108. Within areas 104, 106 and 108 covered by three different antenna feeder cable unit groups respectively, the same carrier frequency, same time slot and same code channel can be used. Consequently, the capacity of mobile communication system is multiplied. As one common baseband digital signal processor of the base station is used, the coverage area of the base station is improved, and subscriber average cost is greatly decreased.

Figure 4:
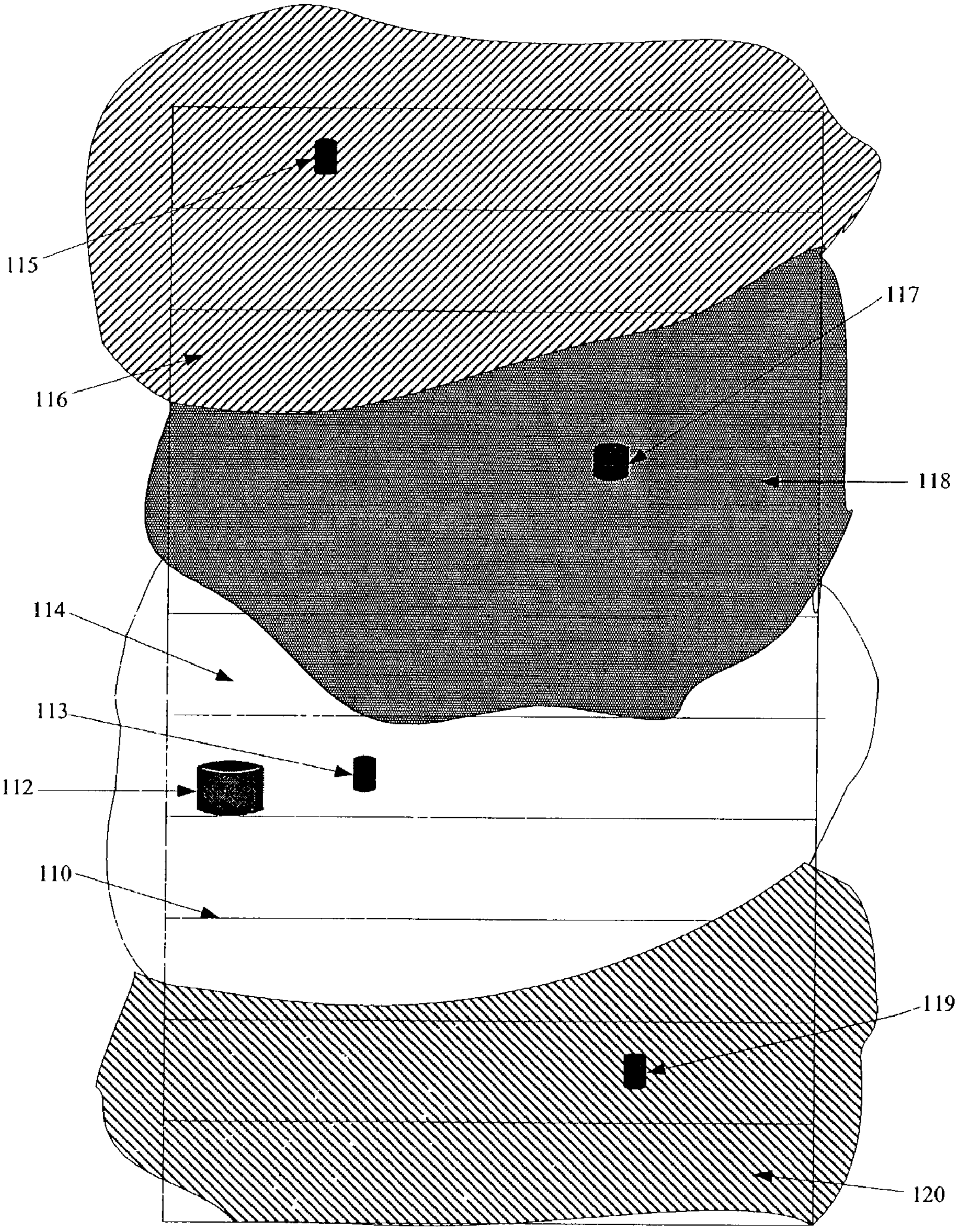
FIG. 4 is a distributed structure diagram of base station of wireless communication system with a distributed smart antenna used at high building.

FIG. 4 shows a distributed embodiment for a base station of wireless communication system with a distributed smart antenna used in a high building. It is known to those of skill in the art that when a carrier frequency is high, for example, in the 2 GHz frequency range, radio waves are lost by building floors and walls. In general, radio waves can only penetrate 3 to 4 floors or walls. If a smart antenna structure of a wireless communication system base station is concentrated as shown in FIG. 1, it is impossible to effectively cover whole buildings 110.

In the embodiment shown in FIG. 4, the wireless communication system base station 112 uses four antenna feeder cable unit groups 115, 117, 113 and 119 which are distributed on four floors, e.g., 2, 5, 8 and 11. The result is that by using one wireless communication system base station the present invention implements, equivalently, four wireless communication system base station coverage ranges 116, 118, 114 and 120. In these four areas 116, 118, 114 and 120 covered by four antenna feeder cable unit groups 115, 117, 113 and 119 respectively, each interleaved antenna feeder cable unit group (interleaving one coverage range) can use same carrier frequency, same time slot and same code channel. For example, antenna feeder cable unit groups 115 and 113 can work with same carrier frequency, time slot and code channel, and antenna feeder cable unit groups 117 and 119 can work with another carrier frequency, time slot and code channel. Consequently, the capacity of mobile communication system is greatly increased. Additionally, because one wireless communication system base station share one baseband digital signal processor, subscriber average cost is greatly decreased while improving coverage.

In a base station of wireless communication system with a distributed smart antenna, the number of antenna feeder cable unit groups is determined by the geographical area or building height (or number of floors) of covering cell, and number of antenna elements and their capacity in each group is selected by number of wireless mobile subscribers in coverage range of each antenna feeder cable unit group. FIG. 4 shows that every two floors install one group of antenna feeder cable unit, and then each interleaved group can use same carrier frequency, time slot and code channel. In a distributed smart antenna system, according to necessities, a user can flexibly set number of smart antenna groups, select number of antenna elements in each group and select setting locations of each group. Then through software in the baseband digital signal processor the whole communication system can operate at an optimized state.

Taking a building wireless communication system as an example, there are many possible requirements.

The first possible situation is as follows. Where the total number of mobile subscribers in the building is a relatively low number, code channels of a general wireless communication system base station satisfies the requirement. Nevertheless, the subscribers are distributed at every floor of the building. Using a concentrated smart antenna, as shown in FIG. 1, a base station can only cover at most 3 to 4 floors. If using a distributed smart antenna system of the present invention, one group of antenna feeder cable unit can be set at each one to two floors, and each group of antenna feeder cable unit includes 1 to M antenna elements, where the number of M is related to number of subscribers and signal propagation environment.

The second possible situation is as follows. Where the total number of mobile subscribers in the building is high, code channels of a general wireless communication system base station do not satisfy the requirement, and subscribers are not well-distributed between every floor of the building from the installation of antenna feeder cable unit point of view. If using a concentrated smart antenna shown in FIG. 1, space diversity advantage of smart antenna will be affected. Using a smart antenna system of the present invention, where all antenna elements can be divided into several groups and each group is installed at a floor, then each group of antenna feeder cable unit uses same frequency, time slot and code channel, but different interference code and training sequence. This is like setting up many independent base stations of micro-micro cell. With this method, the processing ability of existing radio frequency transceivers and baseband digital signal processor is more optimally utilized and the whole communication system is optimized.

During baseband processing, a first respective processing antenna feeder cable unit information in every group, and then diversity processing antenna feeder cable units information of each group, get uplink signal data for uplink beam forming. Then, selecting the antenna feeder cable unit with maximum receiving power, subscriber destination of arrival (DOA) information of the unit is taken to get downlink signal data for downlink beam forming (wherein method of obtaining subscriber DOA information refers to China Patent named "Time Division Duplex Synchronized CDMA Wireless Communication System with Smart Antenna" with Patent No. CN 97104039.7). In such a situation, using the distributed smart antenna system of the present invention overcomes affection of electromagnetic wave loss, so a base station can cover 7 to 8 floors or even more than 10 floors.

In summary, in a distributed smart antenna system of the present invention, antenna elements, relating feeder cables and radio frequency transceivers, which comprise the smart antenna system, are divided into groups, according to coverage range of cell (or building); the selection of the number of antenna elements in every group is based on traffic volume; and every antenna feeder cable unit group is installed at different places (or different floors); but a common baseband digital signal processor of base station is used. Therefore, the present invention improves cell coverage, system capacity is greatly increased, and system cost is decreased.

The invention claimed is:

1. A distributed smart antenna system, comprising:

a plurality of antenna elements;

a plurality of radio frequency transceivers corresponding to the plurality of antenna elements, in one to one ratio, wherein the plurality of radio frequency transceivers connect with a baseband digital signal processor in a wireless communication system base station through a data bus; and a plurality of feeder cables connecting each of said plurality of radio frequency transceivers to a respective one said plurality of antenna elements, wherein the plurality of antenna elements and the plurality of radio frequency transceivers are correspondingly grouped into a plurality of antenna element groups and corresponding multiple radio frequency transceiver groups based on a cell coverage range of the wireless communication system base station or a traffic volume of the cell coverage range or a floor number covered by the wireless communication system base station, wherein each of said plurality of antenna element groups are distributed at different buildings in cells covered by the wireless communication system base station or different floors in a building covered by the wireless communication system base station, wherein each antenna element group connects with corresponding radio frequency transceiver group, and wherein each radio frequency transceiver group connects with the base band digital signal processor through the data bus.

2. The system according to claim 1, wherein each antenna element group has 1 to M antenna elements connected correspondingly with 1 to M radio frequency transceivers of corresponding radio frequency transceiver group, and wherein the selection of the number of M antenna elements is based at least in part on the number of mobile subscribers and the propagation environment.

3. The system according to claim 2, wherein the 1 to M antenna elements of one antenna element group and the 1 to M corresponding radio frequency transceivers are distributed at same location.

4. The system according to claim 2, wherein the 1 to M antenna elements of one antenna element group are distributed at same place and wherein radio frequency transceivers of corresponding and non-corresponding radio frequency transceiver groups are distributed in concentration at a location.

5. The system according tb claim 1, wherein for the different floors in a building, antenna element groups a distributed such that each floor is allocated with an antenna element group or set of two floors are allocated with an antenna element group, and each antenna element group applies same frequency, time slot and code channel.

6. The system according to claim 1, wherein for the different floors in a building, antenna element groups a distributed such that each floor is allocated with an antenna element group, and each antenna element group applies same frequency, time slot and code channel, but different interference codes and training sequences.

7. A distributed smart antenna system, comprising:

a plurality of antenna element groups;

a plurality of radio frequency transceivers groups in communication with the plurality of antenna element groups; and a baseband digital signal processor, wherein each antenna element group comprises 1 to M antenna elements and each radio frequency transceiver group comprises 1 to M radio frequency transceivers; wherein the 1 to M antenna elements of one antenna element group connect correspondingly with 1 to M radio frequency transceivers of one radio frequency transceiver group to form a plurality of groups, wherein antenna elements of different groups are distributed on different buildings within the coverage range of a wireless communication system base station, wherein antenna elements of different groups apply same frequency, time slot and code channel, and wherein radio frequency transceivers of different groups connect with the baseband digital signal processor through a data bus.

8. The system according to claim 7, wherein 1 to M radio frequency transceivers and corresponding 1 to M antenna elements of one group are set in the same or different buildings.

9. A distributed smart antenna system, comprising:

a plurality of antenna element groups;

a plurality of radio frequency transceivers groups, each radio frequency transceiver group corresponding to an antenna element group in one to one ratio; and a baseband digital signal processor, wherein each antenna element group comprises 1 to M antenna elements and each radio frequency transceiver group comprised 1 to M radio frequency transceivers, wherein the 1 to M antenna elements of one antenna element group connect correspondingly with 1 to M radio frequency transceivers of one radio frequency transceiver group to form a plurality of groups, wherein antenna elements of different groups are distributed on different floors of a building within the coverage range of a wireless communication system base station, wherein antenna elements of different floors apply, in interleaving, the same frequency, time slot and code channel, or same frequency, time slot and code channel but different interference codes and training sequences, and wherein radio frequency transceivers of different groups connect with the baseband digital signal processor through a data bus.

10. The system according to claim 9, wherein 1 to M radio frequency transceivers and corresponding 1 to M antenna elements of one group are set on the same floor of different floors of the building.

* * * * *